(12) United States Patent
Boot

(10) Patent No.: US 8,645,285 B2
(45) Date of Patent: Feb. 4, 2014

(54) METHODS AND SYSTEMS INVOLVING DATABASES FOR ENERGY MICROGENERATION DATA

(75) Inventor: John Christopher Boot, Sandy Springs, GA (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 13/168,244

(22) Filed: Jun. 24, 2011

(65) Prior Publication Data

US 2012/0330847 A1 Dec. 27, 2012

(51) Int. Cl.
G06Q 10/00 (2012.01)
G06Q 50/06 (2012.01)
G01R 21/00 (2006.01)

(52) U.S. Cl.
USPC .......................................... 705/412; 705/1.1

(58) Field of Classification Search
CPC ......... G06Q 10/00; G06Q 50/06; G01R 21/00
USPC .................................................. 705/1.1, 412
See application file for complete search history.

(56) References Cited

U.S. PATENT DOCUMENTS

| 2006/0047369 | A1* | 3/2006 | Brewster et al. | 700/291 |
| 2010/0017045 | A1* | 1/2010 | Nesler et al. | 700/296 |
| 2010/0259044 | A1* | 10/2010 | Muchow | 290/43 |
| 2010/0292856 | A1 | 11/2010 | Fujita | |
| 2010/0306027 | A1 | 12/2010 | Haugh | |
| 2012/0065796 | A1 | 3/2012 | Brian et al. | |
| 2012/0232712 | A1* | 9/2012 | Paik | 700/295 |
| 2012/0271686 | A1* | 10/2012 | Silverman | 705/14.1 |

OTHER PUBLICATIONS

Search Report issued in connection with GB Application No. 1210896.5, Oct. 1, 2012.

* cited by examiner

Primary Examiner — Heidi Kelley
(74) Attorney, Agent, or Firm — Cantor Colburn LLP

(57) ABSTRACT

A method for analyzing electrical generation data includes receiving data associated with a generating device at a metered location and storing the data associated with the generating device in a database, receiving data associated with time periods that the generating device is used at the metered location and storing the data in the database, associating the received data associated with a generating device with the data associated with time periods that the generating device is used at the metered location, processing the received data associated with a generating device with the data associated and the time periods that the generating device is used at the metered location to identify time periods that the generating device outputs electrical power to an electrical grid, and identifying a preferred time period that the generating device may be used to output power to the grid.

16 Claims, 4 Drawing Sheets

| Location | Generator Type | Generator Capacity | Net output to Grid | Time | Temporal Data |
|---|---|---|---|---|---|
| 123 Oak St. 30303 | Solar Cell | 1.5 kW | 0.5 kW
1 kW | 1200-1400
1200-1500 | Winter
Summer |
| 444 M St. 30303 | Wind Turbine | 2.4 kW | 1.2 kW
.8 kW | 1800-0900
1800-0900 | Winter
Summer |
| 981 10th St. 30330 | Diesel Generator | 205 kW | 100 kW
0 | 1800-1900
-- | Winter
Summer |

| Location | Substations at Location | Peak Load Times at Substation |
|---|---|---|
| 30303 | SS-108 | 1200-1700 |
|  | SS-111 | 1200-1700 |
|  | SS-156 | 1100-1900 |
| 30330 | SS-098 | 1100-1900 |
|  | SS-167 | 1200-1700 |

402 — 404 — 406

FIG. 4

METHODS AND SYSTEMS INVOLVING DATABASES FOR ENERGY MICROGENERATION DATA

BACKGROUND OF THE INVENTION

The subject matter disclosed herein relates to energy production data, and particularly to electrical microgeneration data.

Microgeneration includes any type of local electricity generation by non-utility entities such as private individuals or businesses. Microgeneration includes renewable electrical generation using, for example solar or wind power and non-renewable electrical generation such as diesel or gas turbine generators.

In practice, electricity produced by a microgenerator is often connected to the utility grid, and may offset portions of the electricity consumed by a microgenerating customer. If the micro generating customer does not consume all of the microgenerated electrical power, the excess electrical power may be used by other consumers on the grid. The utility often compensates a microgenerating customer for the excess microgenerated electrical power provided to the grid.

BRIEF DESCRIPTION OF THE INVENTION

According to one aspect of the invention, a method for analyzing electrical generation data includes receiving data associated with a generating device at a metered location and storing the data associated with the generating device in a database, receiving data associated with time periods that the generating device is used at the metered location and storing the data in the database, associating the received data associated with a generating device with the data associated with time periods that the generating device is used at the metered location, processing the received data associated with a generating device with the data associated and the time periods that the generating device is used at the metered location to identify time periods that the generating device outputs electrical power to an electrical grid, and identifying a preferred time period that the generating device may be used to output power to the grid.

According to another aspect of the invention, a system for analyzing electrical generation data includes a database, and a processor operative to receive data associated with a generating device at a metered location and storing the data associated with the generating device in the database, receive data associated with time periods that the generating device is used at the metered location and storing the data in the database, associate the received data associated with a generating device with the data associated with time periods that the generating device is used at the metered location, process the received data associated with a generating device with the data associated and the time periods that the generating device is used at the metered location to identify time periods that the generating device outputs electrical power to an electrical grid, and identify a preferred time period that the generating device may be used to output power to the grid.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates exemplary entries of the microgeneration database of FIG. 2.

FIG. 4 illustrates exemplary entries of the electrical grid equipment database of FIG. 2.

Figure 1:
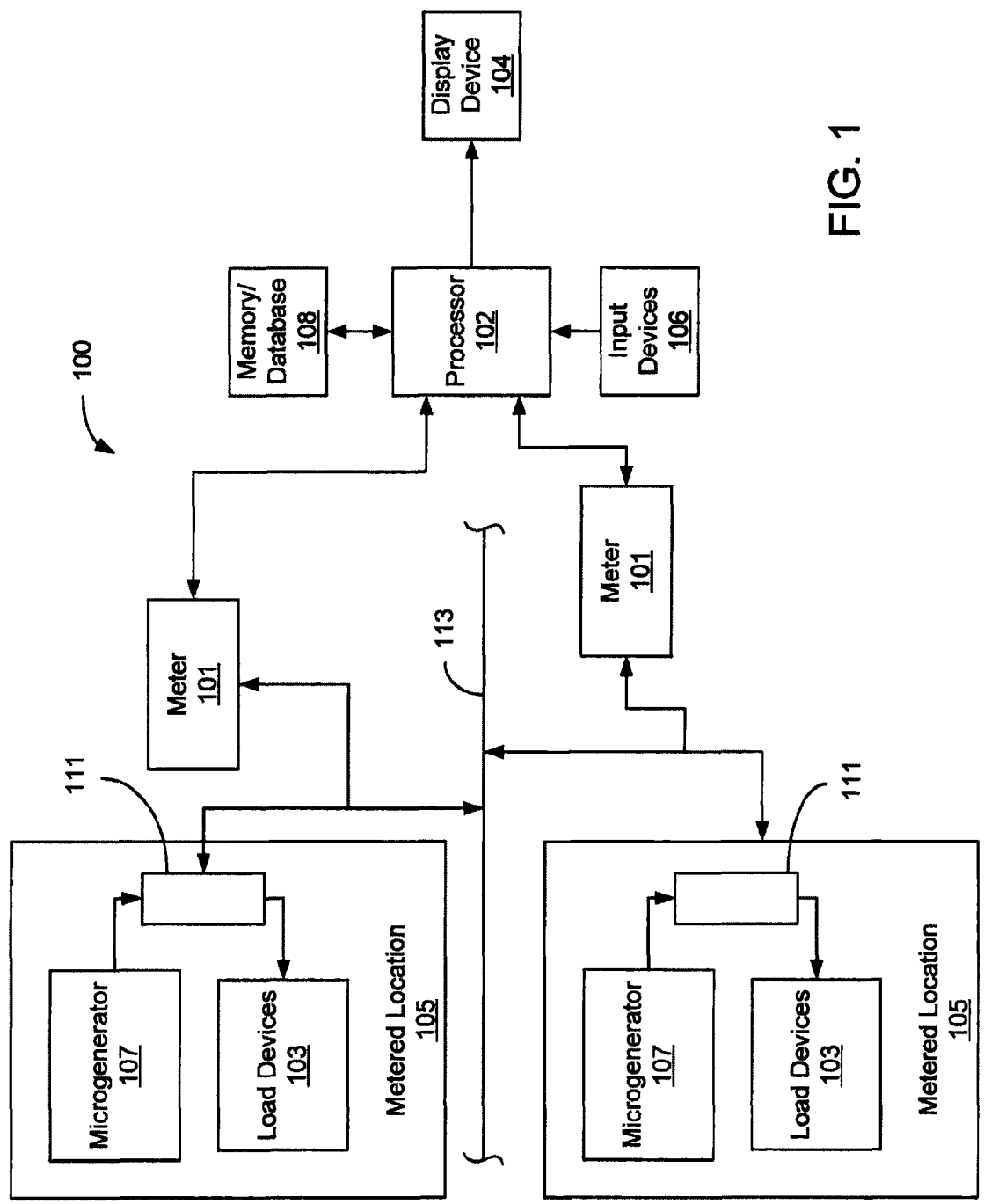
FIG. 1 illustrates an exemplary embodiment of a system 100 that includes a processor.

The detailed description explains embodiments of the invention, together with advantages and features, by way of example with reference to the drawings.

DETAILED DESCRIPTION OF THE INVENTION

Microgeneration includes the generation of electrical power by non-utility entities such as private individual and commercial entities. Microgenerating entities may generate electrical power using, for example, solar, wind, diesel, or gas turbine generators or other types of generating methods. The electrical power that is not used by a microgenerating entity (i.e., excess electrical power) may be used by other electrical consumers connected to the utility grid. The utility meters the microgenerated electricity that is provided to the grid, and often compensates the microgenerating entity for the electricity that is provided to the grid.

Utilities use a number of parameters such as, weather forecasts, days of the week, seasonal consumption data, and historical loading data to forecast grid loading so that the utilities may identify peak and off-peak loading periods. The forecasts allow grid operators to schedule and dedicate available generation capacity that corresponds with the forecasted peak and off-peak load periods. Microgeneration at metered locations in a utility grid may provide additional power to the grid. However, since utilities typically do not control the amount of microgenerated power or the time the power is generated by a microgenerator, microgeneration is rarely considered when utilities forecast grid loading.

Electrical distribution systems generate electrical power using a variety of generation arrangements. For example, an electrical grid may generate power using a steam turbine generator that generates power, and a gas turbine generator that may be used to increase the generating capacity during peak loading periods. The grid may also receive purchased power from other grids during peak loading periods. The power generated by the gas turbine or purchased from another system is often more expensive than the power generated by the steam turbine. Utilities operating such grids may offer demand response incentives to electrical consumers to reduce electrical consumption during periods of operation such as during peak loading periods. For some consumer types such as industrial or commercial consumers, utilities may offer incentives to consume power during lower loading periods. For example, a factory that uses electricity may shift the hours of factory operations to avoid consuming electrical power during peak loading times.

Utilities may offer generation response incentives to microgenerating entities that are similar to demand response incentives described above. Generation response may include, for example, increasing microgeneration output to the grid during peak loading periods while in some instances, decreasing microgeneration output to the grid during off-peak loading periods.

It is desirable for utilities to identify microgenerating entities that may provide power to the grid. In this regard, many utilities facilitate a registration system for microgenerator entities. The registration system typically allows microgenerating entities to register with the utility so that the utility may compensate the entities for power that is provided to the grid. The registration system however, does not provide detailed data that would allow a utility to effectively incorporate microgeneration capacity into load forecasting or generation response incentive programs.

The methods and systems described below allow a utility to collect electrical generation data for micro generating entities, identify times microgeneration devices are used, and the amount of power the micro generation devices provide to the grid. The collected data may be used to, for example, offer generation response incentive programs to micro generating entities.

FIG. 1 illustrates a block diagram of an example of an electrical system 100. The system 100 includes metered locations 105. A metered location 105 may include for example, a dwelling or commercial location. The metered locations 105 include load devices 103 that may include, for example, electrical appliances, heating ventilation and air conditioning (HVAC) systems, industrial machinery, and any other type of electrical device that consumes electrical power. Microgenerators 107 may include any type of microgeneration system such as, for example, solar, wind, diesel, or gas turbine generators. The metered locations 105 are connected to the electrical grid 113 via switching devices 111. Meters 101 are connected to the metered locations 105 to calculate electrical consumption by the metered location 105 and calculate electricity that may be provided to the grid 113 by the microgenerators 107. A processor 102 is communicatively connected to a display device 104, input devices 106, and a memory or database 108. Meters 101 are communicatively connected to the processor 102.

The meter 101 may include a processor and memory that allow the meter to measure and record the consumption of electricity by the load devices 103 and the generation of electricity by the microgenerator 107 over short time intervals (e.g., one second or less). The analysis may include for example, comparing current and voltage measurements over a time period with electrical consumption characteristics of load devices 103 and generation characteristics of microgenerators 107. The analysis may be performed by the processor 102 as illustrated, or another processor (not shown). Once the specific load devices 103 and microgeneratior devices 107 have been identified, the data may be further processed by the processor 102. In an alternate embodiment, the meter 101 may include a traditional electrical meter that records for example, an amount of energy consumed over a time period that is periodically (e.g., monthly) read by a utility to determine energy consumption. In such an arrangement, the energy generated by the microgenerator 107 and provided to the grid 113 may be subtracted at the meter from the energy consumed resulting in an electrical consumption reading that equals the energy consumed from the grid minus the energy provided to the grid.

Though the illustrated embodiment includes a communicative connection between the meters 101 and the processor 102, alternate embodiments of the system 100 may include meters 101 that are not communicatively connected to the processor 102, and may be read manually by a technician. The data collected by the technician may be input to the processor 102 via the input devices 106.

Figure 2:
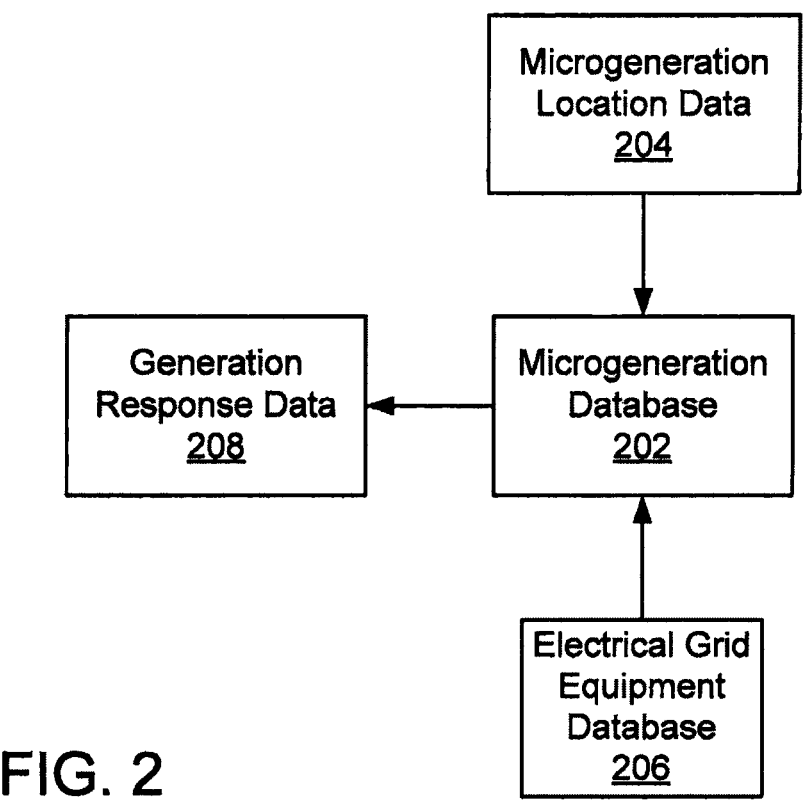
FIG. 2 illustrates an exemplary embodiment of a microgeneration database.

FIG. 2 illustrates an exemplary embodiment of a microgeneration database 202 that includes microgeneration location data 204 and data from an electrical grid equipment database 206. The microgeneration database 202, the microgeneration location data 204, and the electrical grid equipment data base 206 may be stored on, for example, the memory 108 of the system 100 (of FIG. 1) or another similar data processing system.

FIG. 3 illustrates exemplary entries of the microgeneration database 204. The entries include a location field 302; a generator type field 304; a generator capacity field 306; a net output to grid field 308; a time field 310; and a temporal data field 312. The location field 302 includes an address or other similar geographic data or grid location data that identifies a micro generation location. The generator type field identifies the type of generator, and the generator capacity field 306 identifies the capacity of the generator. The net output to grid field 308 and the time field 310 identify the net power that is output to the grid by the microgeneration location (e.g., generated power at location minus consumed power at location) and the times the net power is output to the grid. The net output to grid field 308 and the time field 310 may be populated by, for example, using data collected from the electrical meter 101 (of FIG. 1). The temporal data field 312 includes seasonal data that may, for example, be related to the season or month that a particular net output is realized at a location. Though the illustrated embodiment includes seasons, alternate embodiments may include, for example, ranges of dates, months, or particular days of the week. The location field 302, the generator type field 304, and the generator capacity field 306 may be populated by collecting data from the microgeneration entities. The data may be collected by, for example, soliciting the data through a registration or survey program managed by a utility.

FIG. 4 illustrates exemplary entries of the electrical grid equipment database 206. The entries include a location field 402, a substations at location field 404, and a peak load times at substation field 406.

Figure 5:
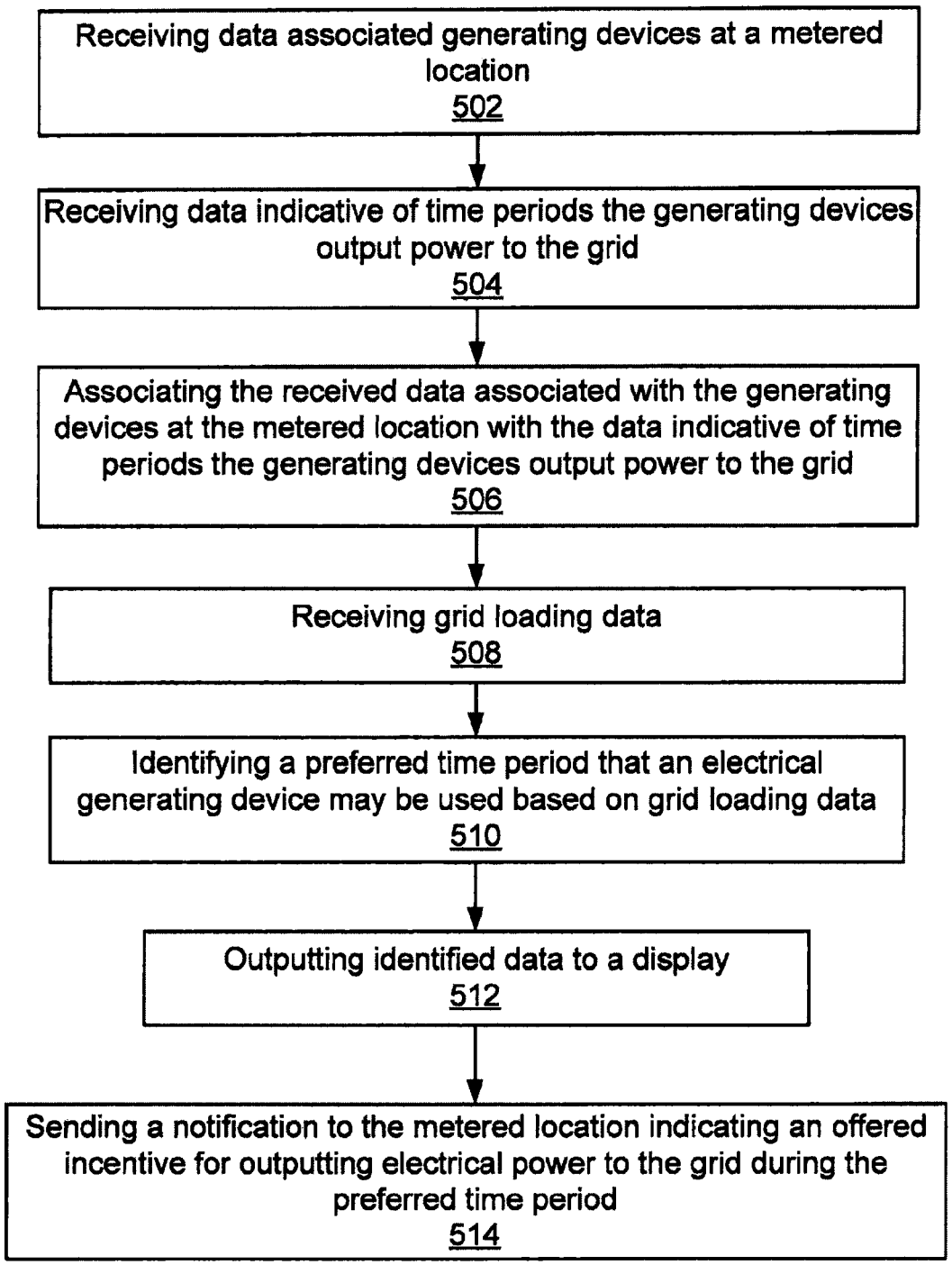
FIG. 5 illustrates a block diagram of an exemplary method of operation of the system of FIG. 1.

FIG. 5 illustrates a block diagram of an exemplary method for identifying electrical consumers and regions that would benefit from an electrical generation response incentive program. In this regard, the microgeneration load database 202 (of FIG. 2) and the system 100 (of FIG. 1) may be used to implement the exemplary method. Referring to FIG. 5, in block 502, data associated with generating devices at a location is received. The data may include for example, an identifier of the location (e.g., an address), the type of generating device, and the capacity of the generating device. This data may be gathered by, for example a registration or survey interaction between the users at the location and the utility. The data may then be entered into a database. In block 504, data is received that indicates time periods and an amount of power the generating device outputs to the grid (generation output data). The data may be gathered by, for example, the meter 101 (of FIG. 1) and output to the processor 102. The received generation output data is associated with the data associated with the generating devices at the location and saved in the microgeneration database 202 in block 506. In block 508, grid loading data is received. The grid loading data includes, for example, times of peak and off-peak power consumption for grid assets. The grid loading times and the times the generating device outputs power to the grid are used along with other factors (e.g., type of generating device, seasonal data, output capacities, net power outputs) to statically correlate and identify alternative or preferred time periods that the generating device may be used to output power to the grid in block 510. In block 512, the identified preferred times are output to the display 104 (of FIG. 1). In block 514 a notification or offer may be sent to the users at the metered location, which may include, for example, an incentive or other type of notification indicative of the preferred generation output times.

In this regard, a utility may send a notification that offers rates for net generation output to the grid at the location during the preferred times. Thus, a user may choose to adjust the net generation output to the grid by, for example, reducing electrical consumption during the preferred times and/or increasing generation output to increase the net power output to the grid at the location. Such a notification allows users to more actively participate in a generation response programs, and allows the utility to more efficiently manage the grid during peak and off-peak loading times by accounting for and encouraging micro generation.

The technical effects and benefits of the illustrated embodiments include methods and systems that allow detailed electrical microgeneration data at metered locations to be used with detailed generation location data in a database. The database may be used to identify consumers that may benefit from generation response programs or other incentives for modifying electrical consumption.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for analyzing electrical generation data comprising:
    receiving, at a processor, data associated with a multiple generating devices at a metered location and storing the data associated with the generating device in a database;
    receiving, at the processor, data associated with time periods that said generating devices is used at the metered location and storing the data in the database;
    processing, using the processor, the data associated with a generating device and the data associated and the time periods that the generating device is used at the metered location to identify time periods that the generating device outputs electrical power to an electrical grid;
    the processor receiving grid loading data indicative of peak grid loading time periods and identifying the preferred time period based on correlating the time periods that the generating device outputs electrical power to the electrical grid with the peak grid loading time periods; and
    sending a notification to the metered location indicating a preferred time period for the generating device to output electrical power to the electrical grid based on the time periods identified that the generating device outputs electrical power to the electrical grid.

2. The method of claim 1, wherein the data associated with the generating device includes a geographic location of the generating device.

3. The method of claim 1, wherein the data associated with the generating device includes an indication of a type of the generation device.

4. The method of claim 1, wherein the data associated with the generating device includes a generation capacity of the generation device.

5. The method of claim 1, wherein the data associated with time periods that the generating device is used at the metered location is received at the processor from a metering device.

6. The method of claim 1, wherein the data associated with time periods that the generating device is used at the metered location includes an indication of net electrical power output to the grid by the metered location at the time periods.

7. The method of claim 1, wherein the preferred time period is output to a user on a display.

8. The method of claim 1, wherein the notification indicates an offered incentive for outputting electrical power to the grid during the preferred time period.

9. A system for analyzing electrical generation data, the system comprising:
    a database; and
    a processor operative to receive data associated with a generating device at a metered location and store the data associated with the generating device in the database, receive data associated with time periods that the generating device is used at the metered location and store the data in the database, process the data associated with a generating device with the data associated with the time periods that the generating device is used at the metered location to identify time periods that the generating device outputs electrical power to an electrical grid, wherein the processor also receives grid loading data indicative of peak grid loading time periods and identifies the preferred time period by correlating the time periods that the generating device outputs electrical power to the electrical grid with the peak grid loading time periods, and send a notification to the metered location indicating a preferred time period for the generating device to output power to the electrical grid based on the time periods identified that the generating device outputs electrical power to the electrical grid.

10. The system of claim 9, wherein the data associated with the generating device includes a geographic location of the generating device.

11. The system of claim 9, wherein the data associated with the generating device includes an indication of a type of the generation device.

12. The system of claim 9, wherein the data associated with the generating device includes a generation capacity of the generation device.

13. The system of claim 9, wherein the processor receives the data associated with time periods that the generating device is used at the metered location from a metering device.

14. The system of claim 9, wherein the data associated with time periods that the generating device is used at the metered location includes an indication of net electrical power output to the grid by the metered location at the time periods.

15. The system of claim 9, wherein the processor outputs the preferred time period to a user on a display.

16. The system of claim 9, wherein the notification from the processor to a user at the metered location indicates an offered incentive for outputting electrical power to the grid during the preferred time period.

* * * * *